United States Patent Office 3,372,184
Patented Mar. 5, 1968

3,372,184
PRODUCTION OF DIALKYL 2,5-DIARYLAMINO-3,6-DIHYDROTEREPHTHALATES
Albert Murphy Auster, Wilmington, Del., assignor to E. I. du Pont de Nemours and Company, Wilmington, Del., a corporation of Delaware
No Drawing. Filed May 12, 1964, Ser. No. 366,917
8 Claims. (Cl. 260—471)

ABSTRACT OF THE DISCLOSURE

A process for preparing a dialkyl 2,5-diarylamino-3,6-dihydroterephthalate by condensing an arylamine with a dialkyl succinylsuccinate in an inert reaction medium in the presence of a salt or the arylamine and trifluoroacetic acid.

---

This invention relates to the condensation of arylamines with succinylsuccinic esters to form dialkyl diarylamino-dihydroterephthalates and to improved processes for the preparation of the latter. More particularly, it relates to the use of new catalysts in such process which improve the efficiency thereof.

The condensation of an arylamine with a dialkyl succinylsuccinate to form a dialkyl 2,5-diarylamino-3,6-dihydroterephthalate is illustrated by the following equation and reaction:

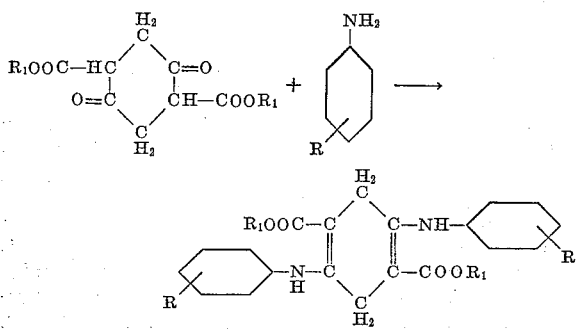

where R may be hydrogen, halogen, alkyl, alkoxy or a fused benzene ring and $R_1$ is an alkyl group containing from 1-4 carbon atoms. This reaction was described by Liebermann as early as 1914 in Ann., 404,272, and is found in U.S. 2,821,541 which discloses the condensation of a dialkyl succinylsuccinate with aniline or substituted anilines in the presence of an inert, high boiling diluent, such as a mixture of biphenyl and diphenyl oxide, with an acidic catalyst which must be soluble in the reaction mixture. Aniline hydrochloride is preferred for such use, but other salts of aniline, such as the hydrobromide, the hydroiodide, the acetate and the nitrate can be employed. The patentee further teaches that to insure requisite solubility of the catalyst in the reaction mixture, a large excess of the arylamine (up to 10 times theory) is used. As disclosed in U.S. 2,821,541, the principal use of the products so made has been in the preparation of quinacridone pigments by subsequent cyclization to dihydroquinacridones and the oxidation thereof to quinacridones. Disadvantageously, the cyclization step is seriously impeded by the presence of the large excess of the arylamine and also by any residue of catalyst. Consequently, it is necessary that the catalyst be neutralized and removed and that the arylamine be removed. It is convenient to remove the arylamine by fractional distillation after neutralization of the catalyst. It is also necessary to subsequently remove the salts formed by the neutralization of the catalyst as by filtration.

It is among the objects of this invention to overcome these and other disadvantages characterizing such prior condensation methods and to provide a new catalyst which can be used to marked advantage in the condensation of arylamines with dialkyl succinylsuccinates. It is a further object to provide a new and improved, alternative form of catalyst for use in such condensations to produce 2,5-diarylamino-3,6-dihydroterephthalate that is advantageously volatile and can be readily removed from the reaction product during distillation treatment to remove the excess arylamine present. Other objects and advantages of the invention will be apparent from the ensuing description.

It has now been discovered that arylamine salts of trifluoroacetic acid can be used to marked advantage as catalysts in the condensation of a succinylsuccinic ester, such as dialkyl succinylsuccinate, with an arylamine, such as aniline. The process of this invention comprises condensing, in an inert diluent and in the presence of a catalyst consisting of an arylamine salt of trifluoroacetic acid, 1 mol of a dialkyl succinylsuccinate with 2 mols of an arylamine, having the following formula:

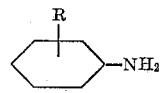

where R is from the group consisting of hydrogen, halogen, alkyl, alkoxy or a fused benzene ring.

In a preferred embodiment of this invention, 1 mol of diethyl succinylsuccinate is suspended in about 3 to 10 times its weight of an inert high boiling liquid preferably the eutectic mixture of 23.5% biphenyl and 76.5% diphenyl oxide, known commercially as "Dowtherm A." The system is then blanketed with an inert gas such as nitrogen and about 3 mols of aniline is added followed by about 0.03 mol of trifluoroacetic acid which reacts at once with part of the aniline to form the aniline salt thereof. Vacuum is then applied and the charge heated under vacuum to about 90° and held at this temperature for about 15 minutes after which the charge is further heated under high vacuum to about 140° C., whereupon the excess aniline and all of the trifluoroacetic acid are removed by distillation. Upon cooling in the presence of nitrogen, the product crystallizes from the "Dowtherm A" eutectic and is isolated and recovered by filtration, washing with alcohol, and drying.

In a further, and still more preferred, modification of the invention, the dialkyl dianilinodihydroterephthalate is not isolated from the "Dowtherm A" but, instead, the reaction mixture is heated further to about the boiling point of the "Dowtherm A" whereupon the dialkyl dianilinodihydroterephthalate is cyclized directly to 6,13-dihydroquinacridone which is a useful intermediate in the preparation of quinacridone pigments. The cyclization may also be accomplished, often with improved yields, by adding the solution of the dianilinodihydro ester in "Dowtherm A" slowly to several volumes of boiling "Dowtherm A."

To a clearer understanding of the invention the following specific examples are given which are intended to illustrate the invention in more detail and are not in limitation thereof. Unless otherwise specified, parts given are by weight.

EXAMPLE I 256 parts of diethyl succinylsuccinate is dissolved in 910 parts of "Dowtherm A" (a eutectic mixture of 23.5% by weight of biphenyl and 76.5% diphenyl oxide) at about 70° C. The resulting solution is charged to a stirred, heated, glass lined reactor equipped with a distillation column and condenser and with means for introducing an inert atmosphere and for applying a vacuum through the condensing system. The system is purged with dry nitrogen and 278 parts (3.0 mols) of aniline is introduced together with 4.9 parts (0.043 mol) trifluoroacetic acid. Vacuum is applied and the charge heated to 90° C. and held at 90° C. for 15 minutes while the vacuum is maintained at 34–35 mm. mercury absolute pressure. The vacuum is then increased to 25 mm. mercury absolute pressure and the charge is heated further to about 140° C. whereupon the excess aniline and all of the trifluoroacetic acid are removed by distillation until the aniline content of the distillate is less than 0.10%. After relieving the vacuum with nitrogen, the charge is cooled while stirring in the presence of nitrogen to give a slurry of diethyl 2,5-dianilino-3,6-dihydroterephthalate in "Dowtherm A." This material may be isolated by filtering, washing free of the eutectic biphenyl and diphenyl oxide mixture with alcohol, and then removing the alcohol in a dryer to give a slightly reddish powder product which may be converted to dihydroquinacridone. This is done without isolation and in the following manner: Instead of cooling after the release of the vacuum with nitrogen, about 500 parts of "Dowtherm A" is added to replace that lost during the removal of the aniline. The resulting solution is added at a steady rate over a period of 1.5 hours to 1350 parts of boiling "Dowtherm A." The charge is then held at reflux for 20 minutes, cooled to about 50° C. under nitrogen atmosphere, filtered, washed free of "Dowtherm A" with methanol and dried to give 287 parts (91.4% yield based on diethyl succinylsuccinate) of dihydroquinacridone, a pale pinkish powder which is readily oxidizable in known manner (see U.S. 2,821,520) to quinacridone of high quality, a valuable red to violet pigment.

EXAMPLE II 256 parts of diethyl succinylsuccinate and 870 parts of "Dowtherm A" described above are charged to the same reactor employed in Example I which is then purged with dry nitrogen. 704 parts (5.5 mols) of o-chloroaniline is then added to the reactor together with 4.8 parts (0.042 mol) of trifluoroacetic acid. Vacuum is applied and the charge heated to 80–85° C. and held at 80–85° C. for 15 minutes while the vacuum is maintained at 34–35 mm. mercury absolute. The vacuum is then increased somewhat and the charge is heated until the o-chloroaniline begins to distill along with the trifluoroacetic acid and some "Dowtherm A." When the distillate contains less than 0.10% o-chloroaniline, the vacuum is released with nitrogen and about 500 parts of "Dowtherm A" is added to replace that lost by distillation. The resulting solution is then added at a uniform rate over a period of 1.5 hours to 1350 parts boiling "Dowtherm A." The charge is finally held at reflux for 20 minutes, cooled to about 50° C. under nitrogen, filtered, washed free of "Dowtherm A" with methanol, and dried to give 335 parts (87.5% yield) of 4,11-dichloro-6,13-dihydroquinacridone which may be readily oxidized by known methods to 4,11-dichloroquinacridone, a valuable yellowish-red pigment.

EXAMPLE III 242 parts of a dialkyl succinylsuccinate containing, on the average, about equal parts of ethyl and methyl groups and 1000 parts of "Dowtherm A" are charged to the reactor described in Example I which is then purged with nitrogen. 321 parts (3 mols) of p-toluidine is then added to the reactor together with 1.5 parts (0.013 mol) of trifluoroacetic acid. Vacuum is applied and the charge heated to 80–85° C. and held at this temperature for 15 minutes while the vacuum is maintained at 34–35 mm. mercury absolute. The vacuum is then increased slightly and the charge heater further until the p-toluidine begins to distill along with the trifluoroacetic acid and some "Dowtherm A." Distillation is continued until the distillate contains less than 0.1% p-toluidine, whereupon the vacuum is released with nitrogen and about 500 parts "Dowtherm A" is added to replace that lost by distillation. The solution is then added (still under nitrogen) at a uniform rate over a period of 1.5 hours to 1350 parts of boiling "Dowtherm A." The charge is then held at reflux for 20 minutes, cooled to about 50° C. under nitrogen, filtered, washed free of "Dowtherm A" with methanol and dried to give 294 parts (86% yield) of 2,9-dimethyl-6,13-dihydroquinacridone which is adapted to be readily oxidized to 2,9-dimethylquinacridone, a magenta colored pigment of excellent quantity.

EXAMPLE IV 256 parts of diethyl succinylsuccinate and 1000 parts of "Dowtherm A" are charged to the reactor described in Example I which is then purged with nitrogen. 321 parts (3 mols) of p-toluidine is then added to the reactor together with 1.5 parts (0.013 mol) of trifluoroacetic acid. Vacuum is applied and the charge heated to 80–85° C. and held at this temperature for 15 minutes while the vacuum is maintained at 34–35 mm. mercury absolute. The vacuum is then increased slightly and the charge heated further until the p-toluidine begins to distill along with the trifluoroacetic acid and some "Dowtherm A." Distillation is continued until the distillate contains less than 0.1% p-toluidine, whereupon the vacuum is released with nitrogen and about 500 parts "Dowtherm A" is added to replace that lost by distillation. The solution is then added (still under nitrogen) at a uniform rate over a period of 1.5 hours to 1350 parts of boiling "Dowtherm A." The charge is then held at reflux for 20 minutes, cooled to about 50° C. under nitrogen, filtered, washed free of "Dowtherm A" with methanol and dried to give 294 parts (86% yield) of 2,9 dimethyl-6,13-dihydroquinacridone which is adapted to be readily oxidized to 2,9-dimethylquinacridone, a magenta colored pigment of excellent quality.

EXAMPLE V 243 parts of aniline (2.6 mols) is added to a slurry of 242 parts (1 mol) of the methylethyl ester of succinylsuccinic acid in 530 parts of tetramethylene sulfone along with 1.4 parts of trifluoroacetic acid. While blanketed with nitrogen, the charge is heated at 105–108° C. under a vacuum of 34–35 mm. Hg for 1 hour. The vacuum is then increased to about 11 mm. Hg and the excess aniline distilled off at about 140° C. along with some tetramethylene sulfone which is replaced from time to time. The vacuum is released with nitrogen and the charge heated to 140° C. to give substantially complete solution which hot solution is then added over a 100 minute period to 400 parts of tetramethylene sulfone, maintained at about 280° C. After boiling for a brief period under reflux, the precipitated solids are filtered, washed with alcohol and dried to give 275 parts of a good quality dihydroquinacridone (88% yield based on the starting succinylsuccinic ester).

The acid function in the catalyst useful in this invention appears to be quite specific in trifluoroacetic acid. The arylamine salts thereof, which actually function as the catalysts, exhibit unique properties of solubility and catalytic activity and also are of such character that they readily dissociate at the temperature of distillation so that both the arylamine and the acid are distilled from the product mixture. As a result it will be found that the following are among the advantages to be derived from practicing the invention:

(1) Reduced requirement for excess arylamine.
(2) Elimination of the step of neutralization of the catalysts and the subsequent filtration required to remove the salts formed in the neutralization.
(3) Reuse of catalysts after distillation from the reaction mixture.
(4) Reduced reaction time.
(5) Improved yields of desired product.

The amount of catalytic trifluoroacetic acid used may vary over a wide range from as much as about 0.05 mol or even more per mol succinylsuccinic ester to as little as about 0.003 mol per mol of succinylsuccinic ester. Preferred amounds are in the range of about 0.01 mol to about 0.05 mol per mol of ester. In the lower ranges, yields tend to drop along with quality so that amounts below the suggested minimum of about 0.003 mol are not recommended. Usage in excess of about 0.05 mol appears to offer no practical or economic advantage, although such higher amounts can be used, if desired.

The invention, it will be understood, is generally applicable to the condensation of arylamines with dialkyl succinylsuccinates. Arylamines contemplated for use comprise aromatic primary amines corresponding to the formula $Ar \cdot NH_2$ having a free position next to the amino group, and in which a hydrogen atom on an aromatic nucleus has been replaced by said amino group. In addition to aniline and the several substituted anilines shown in the examples, use can be made of other halo-substituted anilines, alkyl-substituted anilines, alkoxy-substituted anilines, and arylamines having fused aromatic rings, the only restriction being, as already noted, that the substituent group be relatively inactive and, for the subsequent conversion to quinacridones, that there be a free position ortho to the amino group. Naphthylamines and various substituted derivatives will be found to lend themselves to the reaction under the influence of the new catalyst. Preferred types include aniline, o-chloroaniline, p-chloroaniline, o-toluidine, p-toluidine, m-toluidine, p-anisidine, p-fluoroaniline, p-bromoaniline, p-iodoaniline, p-butylaniline, p-butoxy aniline, beta naphthylamine, etc., as well as other alkyl- and alkoxy-substituted anilines in which the alkyl or alkoxy groups contain 2–4 carbon atoms.

The alkyl groups in the dialkyl succinylsuccinate can be derived from any of lower alkyl group containing up to 4 carbon atoms, such as methyl, ethyl, propyl, isopropyl, n-butyl or isobutyl. It is not necessary that the two alkyl groups be alike.

The inert high boiling liquid in which the reaction is carried out preferably comprises the eutectic mixture of 23.5% biphenyl and 76.5% diphenyl oxide commonly available in the trade as "Dowtherm A." However, the invention is not limited thereto since use is contemplated of many other inert liquids or mixtures which boil within the range of about 225–300° C. Included among such additionally useful liquids are methyl naphthalenes, biphenyl, diphenyl oxide, diethyl phthalate, tetramethylene sulfone and various mineral oils boiling within the above-mentioned temperature range. The amount of inert liquid used also is not critical, but for reasons of economy, the amount of such inert high boiling liquid is kept as low as will provide an acceptable fluid slurry for good agitation. The use of large amounts does no harm, but they make more difficult the ultimate removal in the isolation of the final product and hence are not recommended. A preferred amount of inert liquid ranges from about 2 to 5 times the weight of the dialkyl succinylsuccinate which is to be reacted.

The inert high boiling liquids shown above as the preferred reaction media for the condensation of arylamines with succinylsuccinic esters are preferred only because a high boiling liquid is required in the subsequent cyclization to dihydroquinacridone. The use of the same liquid for both reactions without isolation of the intermediate condensation product is highly desirable from an economic point of view but did introduce the problem of the solubility of the catalyst for the first reaction and the necessity of removing the catalyst before the second reaction, both problems being solved by the use of the arylamine salt of trifluoroacetic acid. Nevertheless, the condensation takes place equally well in low boiling solvents such as the lower alcohols (methanol, ethanol and the like) as well as the lower boiling hydrocarbons such as xylene. The arylamine salt of trifluoroacetic acid is equally suited as the catalyst under these conditions as well, regardless of the exact nature of the inert reaction medium.

Since trifluoroacetic acid is volatile (boiling point 72.4° C.), and its arylamine salts dissociate at the temperature of distillation, it readily distills from the reaction mixture and is conveniently collected with the excess arylamine with which it immediately combines to form again the arylamine salt which functions as the catalyst. By adding the required additional amount of arylamine, the charge is ready for reuse of the catalytic trifluoroacetic acid, and such reuse may be carried out repeatedly subject only to the necessary analytical tests to insure against inadvertent loss of the catalyst and to determine the required make-up of arylamine. It is readily apparent that the ability to distill the catalytic acid from the reaction mixture and reuse it, lends itself to the development of a continuous process whereby the mixture of trifluoroacetic acid and arylamine as distilled from a reaction mixture is recycled along with an additional amount of arylamine and the necessary amount of dialkylsuccinate to a suitable distillation column. As the volatile materials are taken from the top of the column, the product solution is withdrawn from the bottom. The necessary details for the operation of such a continuous process are readily determined by the skilled worker.

Since it is obvious that many modifications can be made in the above described details of the invention without departing from its underlying principles and scope, it is to be understood that the invention is not limited to said details except to the extent set forth in the appended claims.

I claim:

1. In a process for preparing a dialkyl 2,5-diarylamino-3,6-dihydroterephthalate by condensing an arylamine with a dialkyl succinylsuccinate in an inert reaction medium in the presence of an acid catalyst, the improvement which comprises effecting said condensation in the presence of a salt of said arylamine and trifluoroacetic acid.

2. In a process for preparing a dialkyl 2,5-diarylamino-3,6-dihydroterephthalate by condensing an arylamine with a dialkyl succinylsuccinate in an inert liquid comprising a eutectic melt of biphenyl and diphenyl oxide and in the presence of an acid catalyst, the improvement which comprises effecting said condensation in the presence of a salt of said arylamine and trifluoroacetic acid.

3. The process of claim 2 in which the arylamine is aniline.

4. The process of claim 2 in which the arylamine is o-chloroaniline.

5. The process of claim 2 in which the arylamine is p-chloroaniline.

6. The process of claim 2 in which the arylamine is p-toluidine.

7. The process of claim 2 in which the arylamine is p-anisidine.

8. In a process for preparing a dialkyl 2,5-diarylamino-3,6-dihydroterephthalate by condensing an arylamine with a dialkyl succinylsuccinate in an inert liquid comprising tetramethylene sulfone in the presence of an acid catalyst, the improvement which comprises effecting said condensation in the presence of a salt of said arylamine and trifluoroacetic acid.

References Cited

UNITED STATES PATENTS 2,821,541   1/1958   Struve _____ 260—471

LORRAINE A. WEINBERGER, *Primary Examiner.*

L. ARNOLD THAXTON, *Assistant Examiner.*